(12) United States Patent
Brandlhuber et al.

(10) Patent No.: US 11,927,513 B2
(45) Date of Patent: Mar. 12, 2024

(54) EXTRACTION SYSTEM FOR EXTRACTING ANALYTES FROM A SAMPLE

(71) Applicant: LCTech GmbH, Obertaufkirchen (DE)

(72) Inventors: Martin Brandlhuber, St. Wolfgang (DE); Uwe Aulwurm, Velden/Vils (DE)

(73) Assignee: LCTech GmbH, Obertaufkirchen (DE)

( * ) Notice: Subject to any disclaimer, the term of this patent is extended or adjusted under 35 U.S.C. 154(b) by 173 days.

(21) Appl. No.: 17/557,636

(22) Filed: Dec. 21, 2021

(65) Prior Publication Data
US 2022/0196522 A1 Jun. 23, 2022

(30) Foreign Application Priority Data

Dec. 23, 2020 (DE) ...................... 10 2020 134 836.3

(51) Int. Cl.
*B01L 3/00* (2006.01)
*B01L 7/00* (2006.01)
(Continued)

(52) U.S. Cl.
CPC ............... *G01N 1/40* (2013.01); *B01L 3/502* (2013.01); *B01L 7/00* (2013.01); *B01L 9/50* (2013.01); *B01L 2200/0689* (2013.01); *B01L 2300/0832* (2013.01); *B01L 2300/14* (2013.01); *B01L 2300/18* (2013.01)

(58) Field of Classification Search
CPC .... B01L 3/505; B01L 7/00; B01L 9/50; B01L 2200/068; B01L 2200/025; B01L 2300/0832; B01L 2300/14; B01L 2300/18; B01L 2200/0689; G01N 1/40; G01N 2011/4061; G01N 2001/4061; G01N 1/4055; G01N 1/44
See application file for complete search history.

(56) References Cited

U.S. PATENT DOCUMENTS 5,601,707 A * 2/1997 Clay ................... F16K 15/1823
  210/511
9,095,833 B2 8/2015 Demmitt
(Continued)

FOREIGN PATENT DOCUMENTS

DE 102005063572 4/2013
EP 0078435 5/1983
(Continued)

*Primary Examiner* — Jill A Warden
*Assistant Examiner* — Michael Stanley Gzybowski
(74) *Attorney, Agent, or Firm* — Renner, Kenner, Greive, Bobak, Taylor & Weber

(57) ABSTRACT

The extraction system according to the invention for extracting analytes from a sample comprises
an extraction cell for receiving the sample, which has at least one first fluid connector for the supply or discharge of a fluid, and
a clamping device for clamping the extraction cell, and
a fluid connection device for establishing a fluid connection with the at least one first fluid connector of the extraction cell,
wherein an extraction cell holder is provided for receiving the extraction cell, and the clamping device has a guiding and positioning arrangement for linearly inserting the extraction cell holder, together with the extraction cell, in order to position the extraction cell in an insertion position.

15 Claims, 12 Drawing Sheets

(51) Int. Cl.
  *B01L 9/00*   (2006.01)
  *G01N 1/40*   (2006.01)

(56) References Cited

U.S. PATENT DOCUMENTS

| | | |
|---|---|---|
| 2011/0212539 A1 | 9/2011 | Howells et al. |
| 2015/0085290 A1 | 3/2015 | Fjerdingstad |
| 2017/0361314 A1 | 12/2017 | Stadler et al. |
| 2019/0201898 A1 | 7/2019 | Cucchi et al. |
| 2020/0355661 A1 | 11/2020 | Villinger et al. |

FOREIGN PATENT DOCUMENTS

| | | |
|---|---|---|
| EP | 0868931 | 10/1998 |
| EP | 1170057 | 1/2002 |
| EP | 1030736 | 10/2003 |
| EP | 1208189 | 10/2004 |
| EP | 1614474 | 8/2007 |
| EP | 2767828 | 12/2014 |
| EP | 2918323 | 9/2015 |
| EP | 3907005 | 11/2021 |
| WO | 9627417 | 9/1996 |

\* cited by examiner

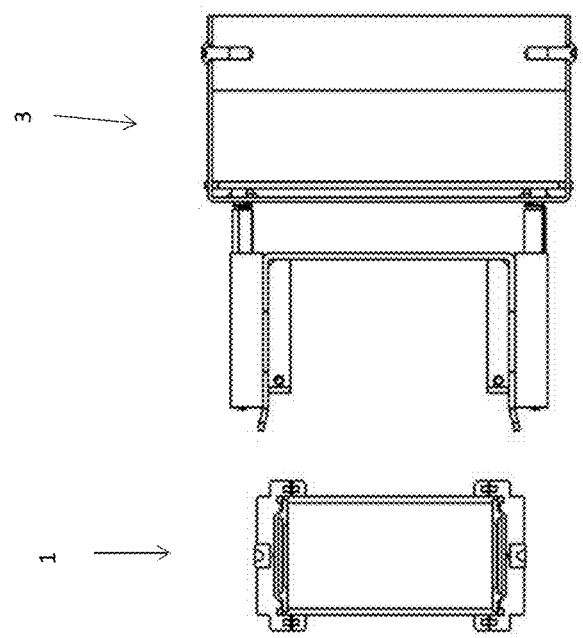
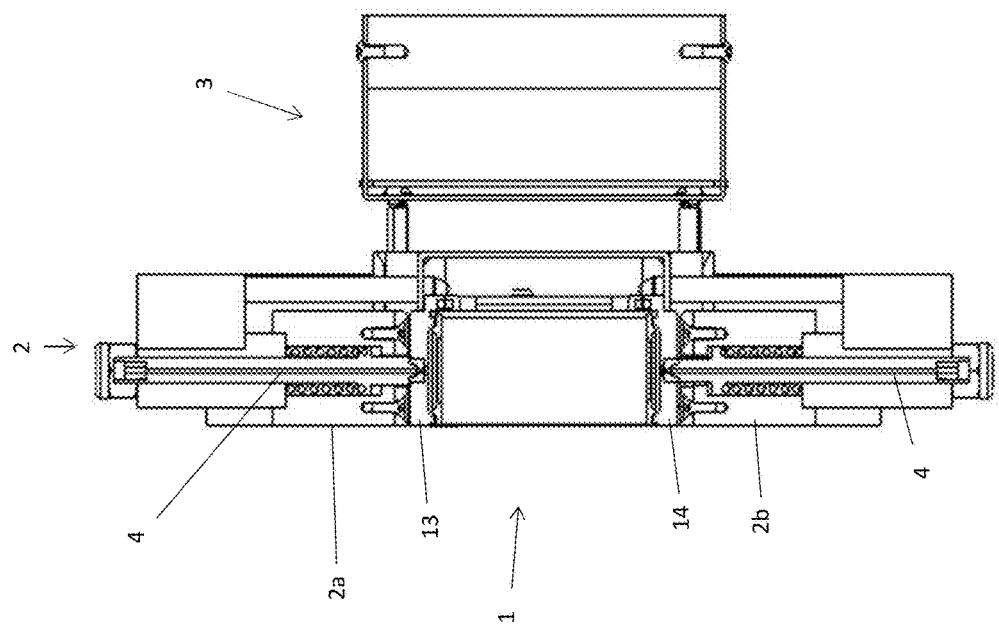
Fig. 1

EXTRACTION SYSTEM FOR EXTRACTING ANALYTES FROM A SAMPLE

TECHNICAL FIELD

The invention relates to an extraction system for extracting analytes from a sample.

BACKGROUND

Extraction systems are used to extract certain analytes, such as pesticides, PCBs, PAHs, dioxins, and other components, from an examined sample material with the help of solvents. The analytes are then typically fed to an analysis system after further cleaning.

The sample material being examined is first placed in an extraction cell, which normally has a tubular extraction element, both ends of which are closed by closure arrangements, such that an interior space is produced for receiving the sample material being examined. The solvent or another suitable fluid is supplied or discharged via supply and discharge openings in the closure arrangements. The closure arrangements are often screwed to the extraction element, as is known, for example, from EP 2 918 323 A1 or EP 0 868 931 A1.

EP 3 907 005 A1 also discloses an extraction cell of the applicant, in which the closure arrangements each have at least one adhesive arrangement designed as a permanent magnet adhesive arrangement or as a Velcro fastener or as a silicone-based closure for holding the closure arrangements on the extraction element.

Such an adhesive arrangement has the advantage that the closure arrangement only has to be attached or removed, rather than needing to be screwed on. This considerably simplifies the handling of the extraction cells.

The extraction cell loaded with the sample is then clamped in a clamping device by clamping jaws pressing on the two closure elements of the extraction cell and establishing a fluid connection with the inlet and/or outlet openings of the extraction cell via a fluid connection device. In the actual extraction process, the provided fluid, for example a solvent, optionally under pressure, is then supplied via a fluid feed line, wherein the extraction cell and thus the sample are optionally heated to a predetermined temperature for the purpose of accelerating the extraction. Pressures of up to 100 bar and temperatures of up to 200° C. may be reached in this case. A valve is then opened in the fluid discharge line in order to discharge extraction solution via the fluid discharge line. A frit inserted in the extraction element holds back the sample and only allows the supplied fluid to pass, together with the extracted analytes. The discharged fluid is then subjected to further processing and/or analysis.

Instead of the static method described above, the extraction cell can also be used in a dynamic method in which the extraction fluid flows continuously through the extraction cell.

In automated systems, a large number of extraction cells are located in a carousel or frame, and are automatically transferred from there to the clamping device, processed there, and then returned again. Such a system is known, for example, from EP 0 820 334 B1.

Another clamping device is known, for example, from EP 0 078 435 A2. EP 2 767 828 B1 discloses a clamping device for clamping several columns for sample preparation, which columns are arranged one above the other. In this case, a plurality of slidably displaceable clamping blocks is provided. These are held on a guide rail and can be displaced via a displacement mechanism, such that several columns can be clamped one behind the other in the axial direction between the clamping blocks.

DE 696 35 777 T2 discloses an extraction system in which the extraction cells, which each have an upper and a lower removable closure element, are held in a cell shell and can be moved between the cell shell and an oven by means of a piston-cylinder arrangement.

SUMMARY

The invention is based, proceeding from this point, on the object of simplifying the handling of the extraction cells, and in particular the positioning of the extraction cell in the clamping device of an extraction system.

According to the invention, this object is achieved by the features of claim 1.

The extraction system according to the invention for extracting analytes from a sample comprising
- an extraction cell for receiving the sample, which has at least one first fluid connector for the supply or discharge of a fluid, and
- a clamping device for clamping the extraction cell, and
- a fluid connection device for establishing a fluid connection with the at least one first fluid connector of the extraction cell, wherein an extraction cell holder is provided for receiving the extraction cell, and the clamping device has a guiding and positioning arrangement for linearly inserting the extraction cell holder, together with the extraction cell, in order to position the extraction cell in an insertion position.

The positioning of the extraction cell in the clamping device is considerably simplified by the extraction cell holder. If the extraction cell is heated up during the extraction, it can also be removed with the extraction cell holder in a hot state, since the extraction cell does not have to be touched immediately when it is removed and it is not necessary to wait for the extraction cell to cool down.

Further embodiments of the invention are the subject matter of the dependent claims.

The extraction cell preferably has a tubular extraction element with a first end and an opposite second end, which extraction element has an interior space for receiving the sample, and the extraction cell furthermore has a first closure arrangement for closing and sealing the first end of the tubular extraction element, and a second closure arrangement for closing and sealing the second end of the tubular extraction element.

Furthermore, the first closure arrangement can have the first fluid connector and the second closure arrangement can have a second fluid connector for the supply or discharge of a fluid.

The extraction cell holder can in particular comprise a receiving holder for holding the extraction cell, and a manipulating handle for inserting the extraction cell holder into the extraction system and pulling it out of the same.

According to a preferred embodiment, the guiding and positioning arrangement furthermore has at least one locking element which, when the extraction cell holder is in the inserted position, is in a locking position with the latter. Ideally, the locking element is preloaded with a spring, such that the locking takes place automatically in the inserted position. A triggering element which is formed, for example, by an electromagnet or a mechanical push button can be provided to move the locking element from the locking position to an open position.

According to a further embodiment of the invention, the extraction system can have at least two heating jaws which can move between an open position and a heating position, and which are in heating contact with the extraction cell in the heating position. In this way, it is possible to carry out extractions which are carried out at elevated temperatures of, for example, 30 to 200° C. Since the extraction cells are typically cylindrical, the heating jaws are preferably designed in the shape of a half-shell, such that the heating jaws enclose the extraction cell in a form-fitting manner in the heating position in order to ensure good heat transfer. To adapt the at least two heating jaws to smaller diameters of the extraction cells, adapter pieces can also be provided which are designed for attachment to the heating jaws. These adapter pieces can be pushed onto the heating jaws, for example. They should also be made of a material that conducts heat well.

In order to move the heating jaws from the open position to the heating position, a displacement mechanism is preferably provided which comes into or is in operative contact with the extraction cell holder, during the linear insertion of the latter, in order to move the heating jaws. In this way, along with the insertion movement of the extraction cell holder, in addition to the positioning of the extraction cell, the heating jaws are also closed around the extraction cell at the same time.

The extraction cell is inserted by means of the extraction cell holder in a linear movement, and this insertion is divided into two functional paths. On the one hand, the extraction cell is first positioned in the clamping system of the extraction system with the heating jaws still open. In a further movement of parts of the extraction holder, the extraction cell is locked and the heating jaws are closed around the extraction cell. The extraction cell, which is typically oriented vertically, is then clamped in place, a fluid connection being established with the at least one first fluid connector of the extraction cell via the fluid connection device. In this position, the extraction cell can, if desired, be exposed to temperatures of up to 200° C. and an elevated pressure of up to 100 bar. The heating jaws that close around the extraction cell are preferably spring-loaded, and thus generate a defined contact pressure on the extraction cell in order to ensure ideal heat transfer and to be able to compensate for any manufacturing tolerances of the extraction cells at the same time.

The heating jaws are preferably each mounted rotatably about an axis of rotation, the displacement mechanism converting the linear insertion movement of the extraction cell holder into a rotation of the heating jaws about their axes of rotation. The heating device can furthermore have at least one spring element for opening the heating jaws from the heating position into the open position, wherein the at least one spring element is arranged in such a manner that it is preloaded when the heating jaws are moved from the opening position into the heating position.

The extraction cell holder preferably has a receiving holder for holding the extraction cell and a manipulating handle for inserting the extraction cell holder into the extraction system and pulling it out of the same, wherein at least one, preferably 4 locking pins are movably guided in the receiving holder, and can be moved relative to the receiving holder by means of the manipulating handle. With this configuration, the extraction cell inserted in the extraction cell holder can be inserted into the clamping device and positioned while the locking pin engages the locking element, and in this way holds the extraction cell or the extraction cell holder in the locking position until it is released again by the trigger element being actuated.

In a further embodiment of the invention, a protective plate can be provided between the receiving holder and the manipulating handle of the extraction cell holder, which serves as heat or burst protection. In this way, extraction cells that have been heated to high temperatures for the extraction can be removed again at an early stage, since any radiant heat is kept away. In the unusual event that an extraction cell should burst, the protective plate could prevent parts of the extraction cell or the sample contained therein from flying out of the clamping device in an uncontrolled manner or from hitting the hand gripping the handle.

DESCRIPTION OF THE DRAWINGS

Further configurations of the invention are explained in more detail with reference to the following description.

In the drawings:

FIG. 1 is a schematic representation of the extraction system according to the invention.

DETAILED DESCRIPTION

Figure 2:
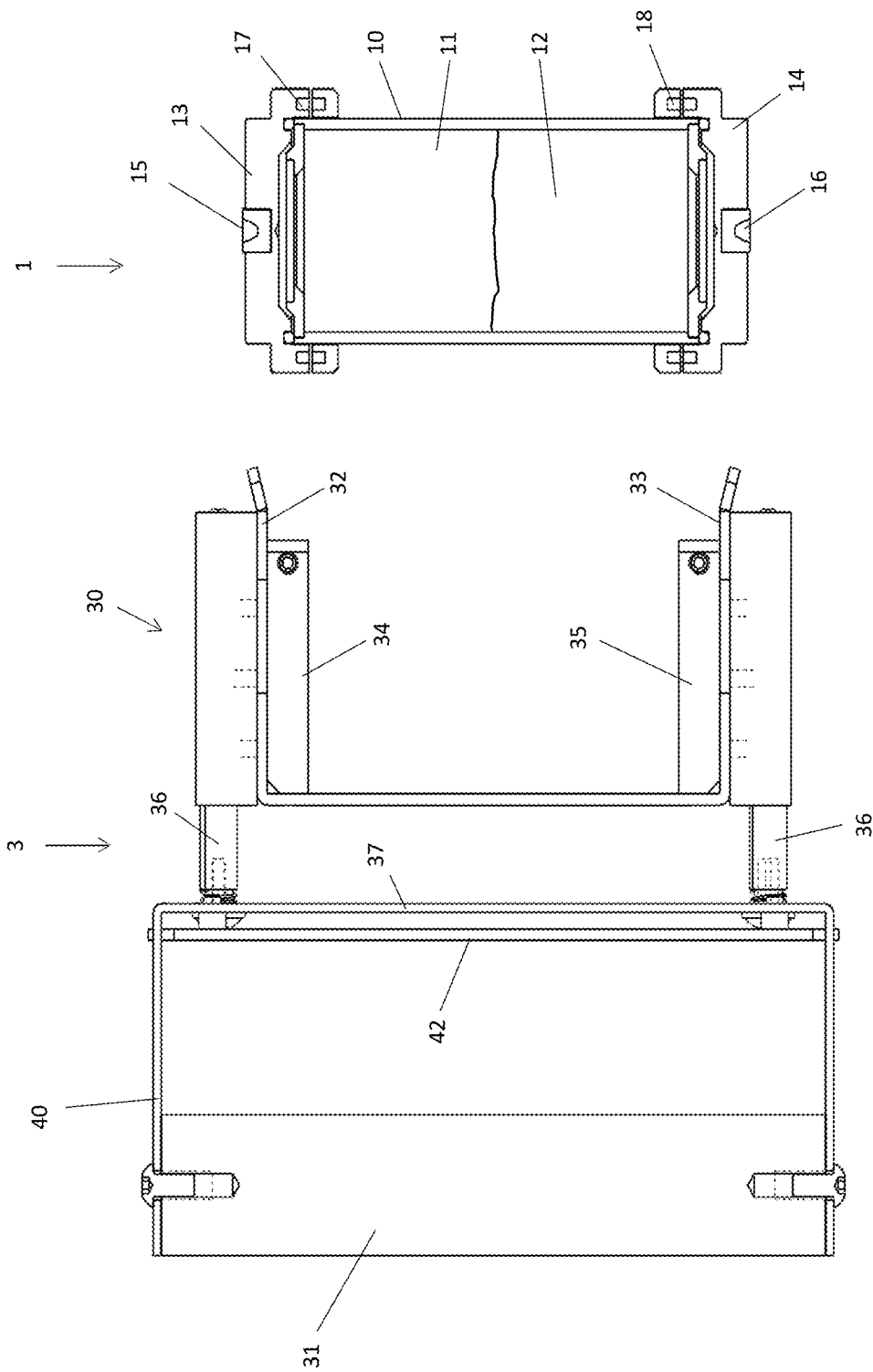
FIG. 2 is a schematic side view of the extraction cell holder and the extraction cell.
Figure 3:
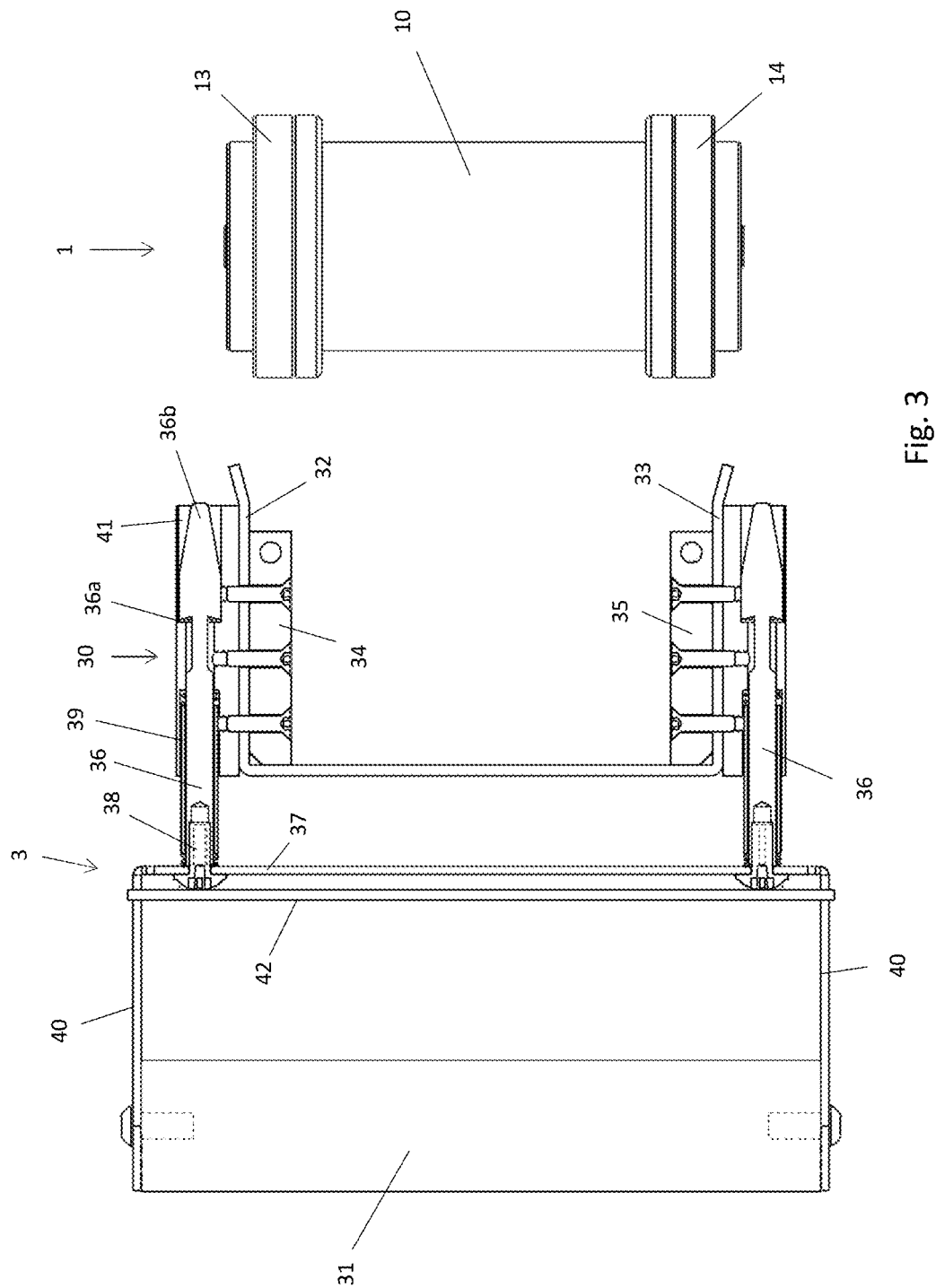
FIG. 3 is a partially sectional side view of the extraction cell holder and the extraction cell.
Figure 4:
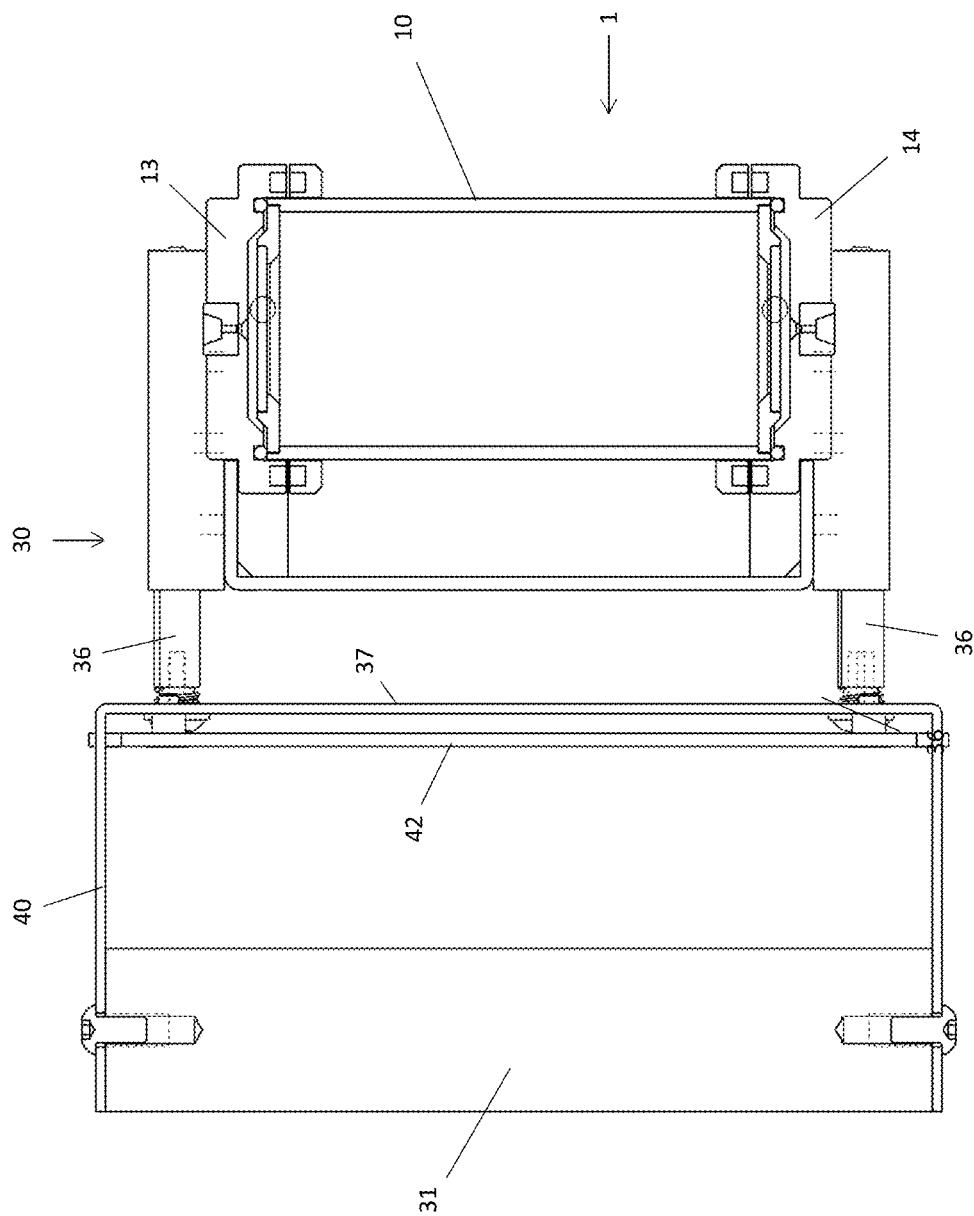
FIG. 4 is a partially sectional side view of the extraction cell holder with the extraction cell inserted.
Figure 5:
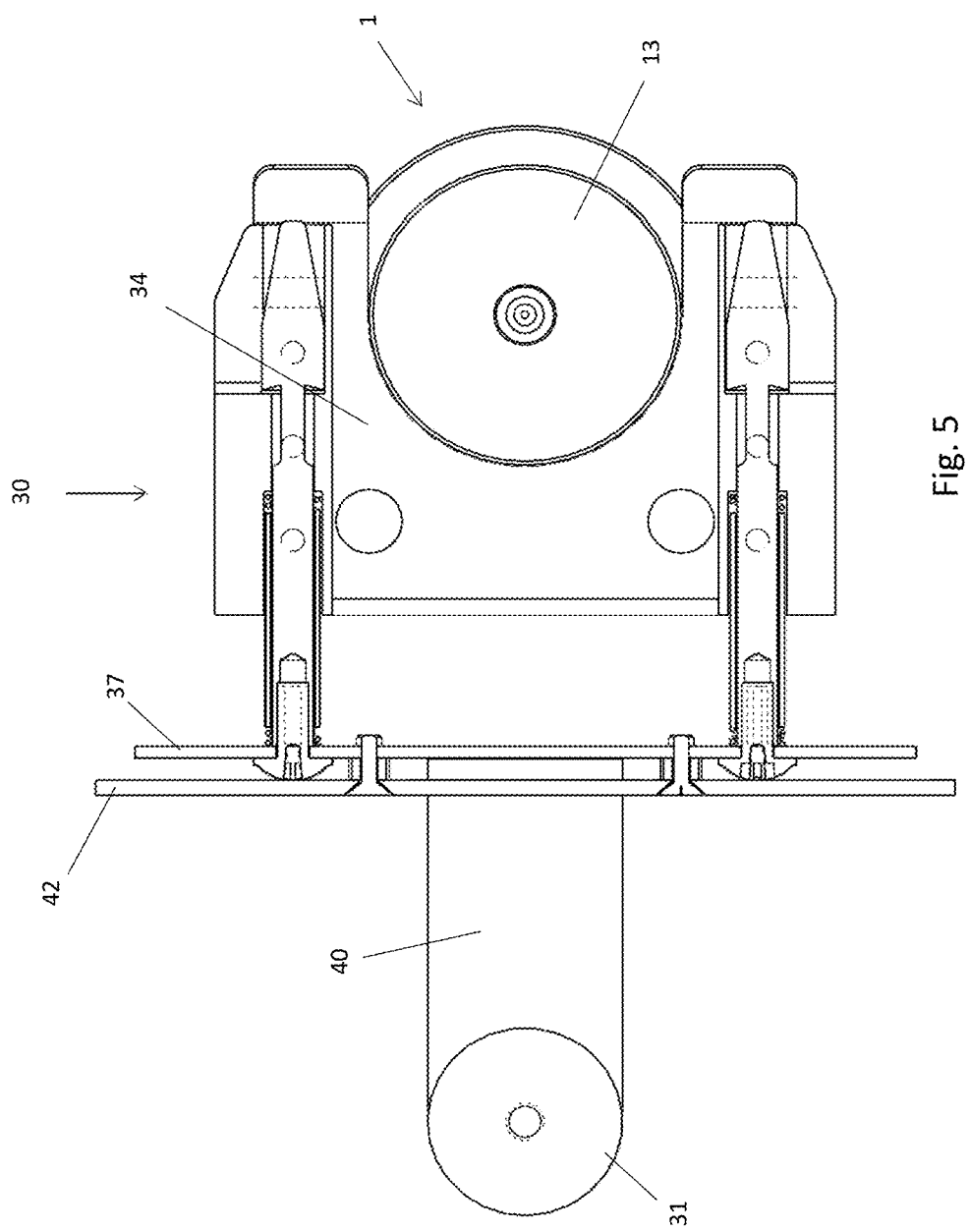
FIG. 5 is a partially sectional plan view of the extraction cell holder with the extraction cell inserted.

The extraction system shown in FIG. 1 for extracting analytes from a sample substantially has an extraction cell 1 for receiving the sample, a clamping device 2 for clamping the extraction cell 1, and an extraction cell holder 3 for receiving the extraction cell 1 in order to insert it into the clamping device 2 and to position it.

The extraction cell 1 and the extraction cell holder 3 are explained in more detail below with reference to FIGS. 1 to 5.

The extraction cell 1 has a tubular extraction element 10 with a first end and an opposite second end, which provides an interior space 11 for receiving a sample 12. Furthermore, a first closure arrangement 13 for closing and sealing the first end of the tubular extraction element 10, and a second closure arrangement 14 for closing and sealing the second end of the tubular extraction element 10, are provided. The first closure arrangement 13 has a first fluid connector 15 for the supply or discharge of a fluid. In a corresponding manner, the second closure arrangement 14 provides a second fluid connector 16 for the supply or discharge of a fluid. The two closure arrangements 13, 14 are fastened to the tubular extraction element 10 in a suitable manner. This can be done, for example, by means of a conventional screw connection. Preferably, however, between the extraction element 10 and the first closure arrangement 13 and between the extraction element 10 and the second closure arrangement 14 there is, respectively, at least one adhesive arrangement 17, 18 for holding the first and second closure arrangement 13, 14 on the extraction element 10. For more detailed configurations of the preferred configuration of the extraction cell 10 with adhesive arrangements 17, 18, reference is made to EP 3 907 005 A1 of the applicant.

The extraction cell holder 3 has a receiving holder 30 for holding the extraction cell 1, and has a manipulating handle 31 for inserting the extraction cell holder 3 into the extraction system and pulling it out of the same. For the purpose of receiving the tubular extraction element 10, the receiving holder 30 provides an upper receiving rail 32 and a lower receiving rail 33, which are equipped with an upper receiving region 34 and a lower receiving region 35, respectively, which are cut out in a semicircular shape in the plan view according to FIG. 5. When the extraction cell 1 is inserted, the two receiving regions 34, 35 come into frictional contact with the first and second closure arrangements 13, 14, respectively, in order to hold the extraction cell 1 in place for the transfer into the clamping device 2. The semi-circular cutout receiving regions 34, 35 also serve to ensure the exact positioning of the extraction cell 1 within the extraction cell holder 3.

To insert the extraction cell 1 into the extraction cell holder 3, the extraction cell 1 is simply pressed manually into the two receiving regions 34, 35. In the context of the invention, however, it is also conceivable that the extraction cell holder is attached to a robot arm, and that the reception of the extraction cell and the transfer into and out of the clamping device takes place in an automated manner.

To lock the extraction cell holder 3 (with the extraction cell inserted) in the clamping device 2, the extraction cell holder has several, in particular four, locking pins 36 which are movably guided in bores 41 of the receiving holder 30. For this purpose, the locking pins 36 are fastened with one end protruding from the receiving holder 30 to a fastening plate 37 by means of screws 38. Each locking pin 36 interacts with ejector springs 39 supported in the receiving holder 30. The manipulating handle 31 is connected to the fastening plate 37 via arms 40, such that the locking pins 36 can be inserted into the holder 30 by a movement of the manipulating handle 31 with respect to the receiving holder 30, compressing the ejection springs 39.

A protective plate 42 is also arranged between the fastening plate 37 and the manipulating handle 31, and extends beyond the length of the receiving holder 30 both in the side view and in the top view. The protective plate 42 serves in particular as heat and/or burst protection in the event that the extraction cell is still relatively hot, or should burst, after the extraction. The heat and/or burst protection is further improved in the illustrated embodiment by the fact that the fastening plate 37 also extends over the circumference of the receiving holder 30, and is arranged at a distance from the protective plate 42 parallel thereto. There is sufficient space between the manipulating handle 31 and the protective plate 42 to allow gripping the extraction cell holder 3.

Figure 6:
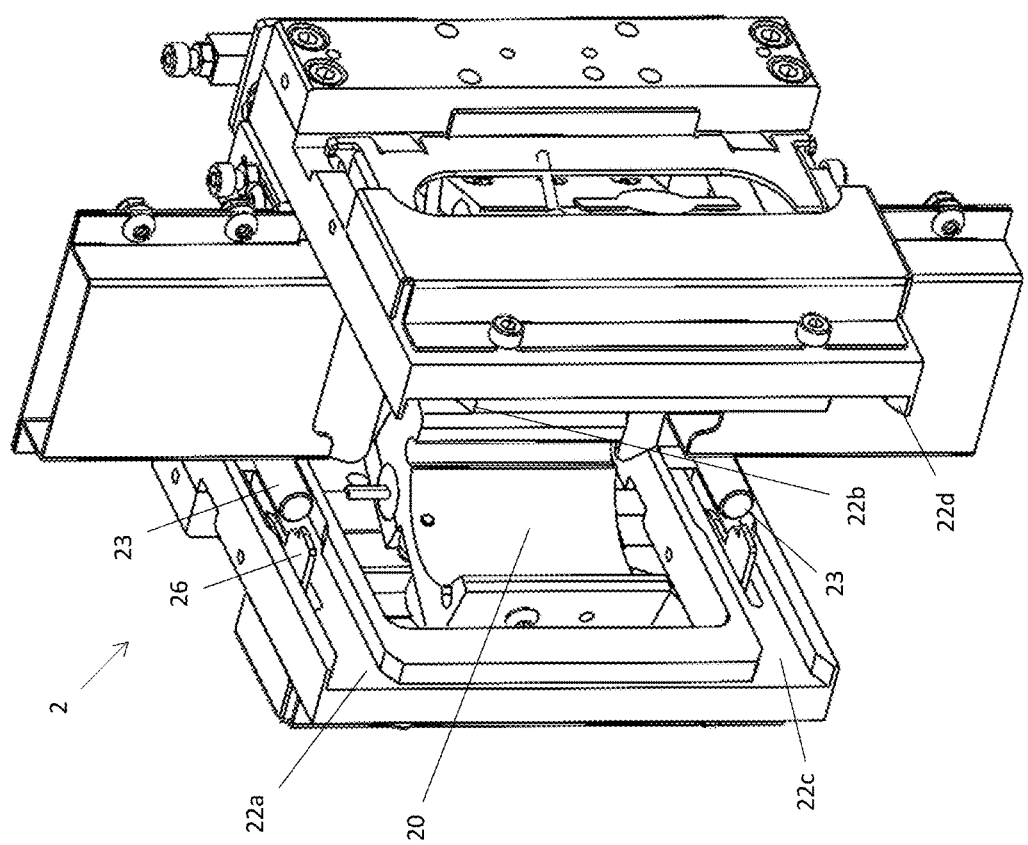
FIG. 6 is a three-dimensional representation of the clamping device with open heating jaws.
Figure 7:
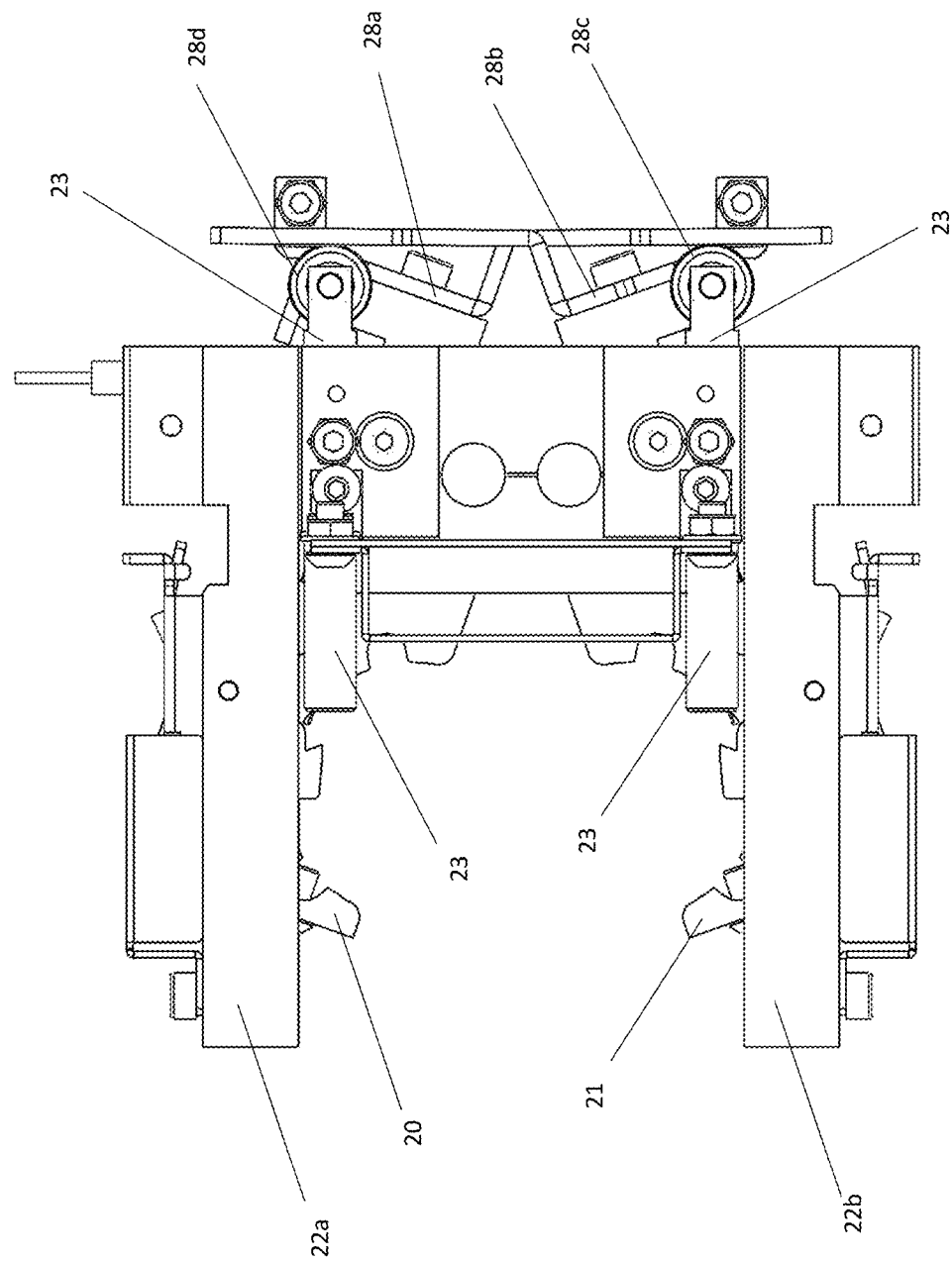
FIG. 7 is a top view of the clamping device according to FIG. 6.
Figure 8:
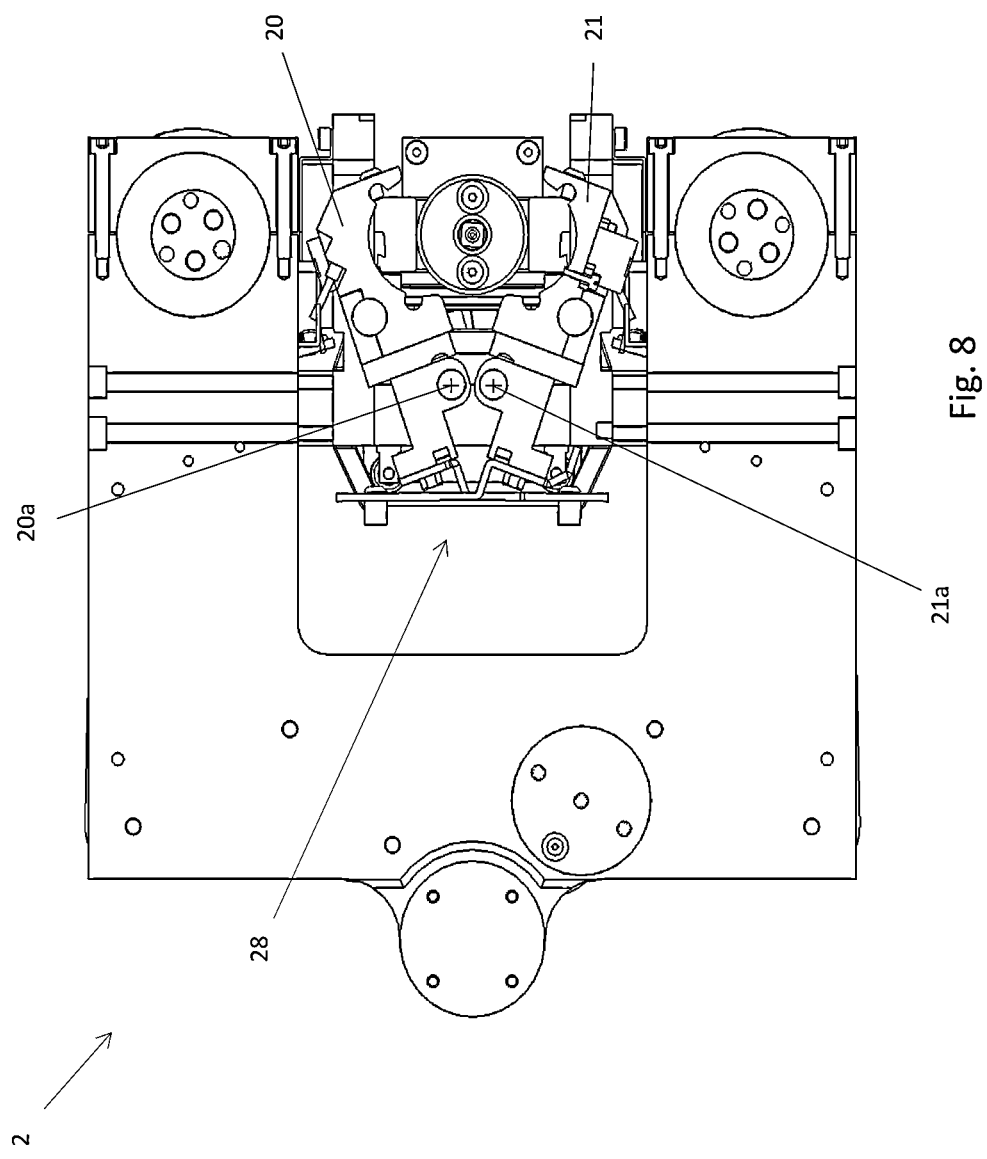
FIG. 8 is a partially sectional plan view of the clamping device before the insertion of the extraction holder.
Figure 9:
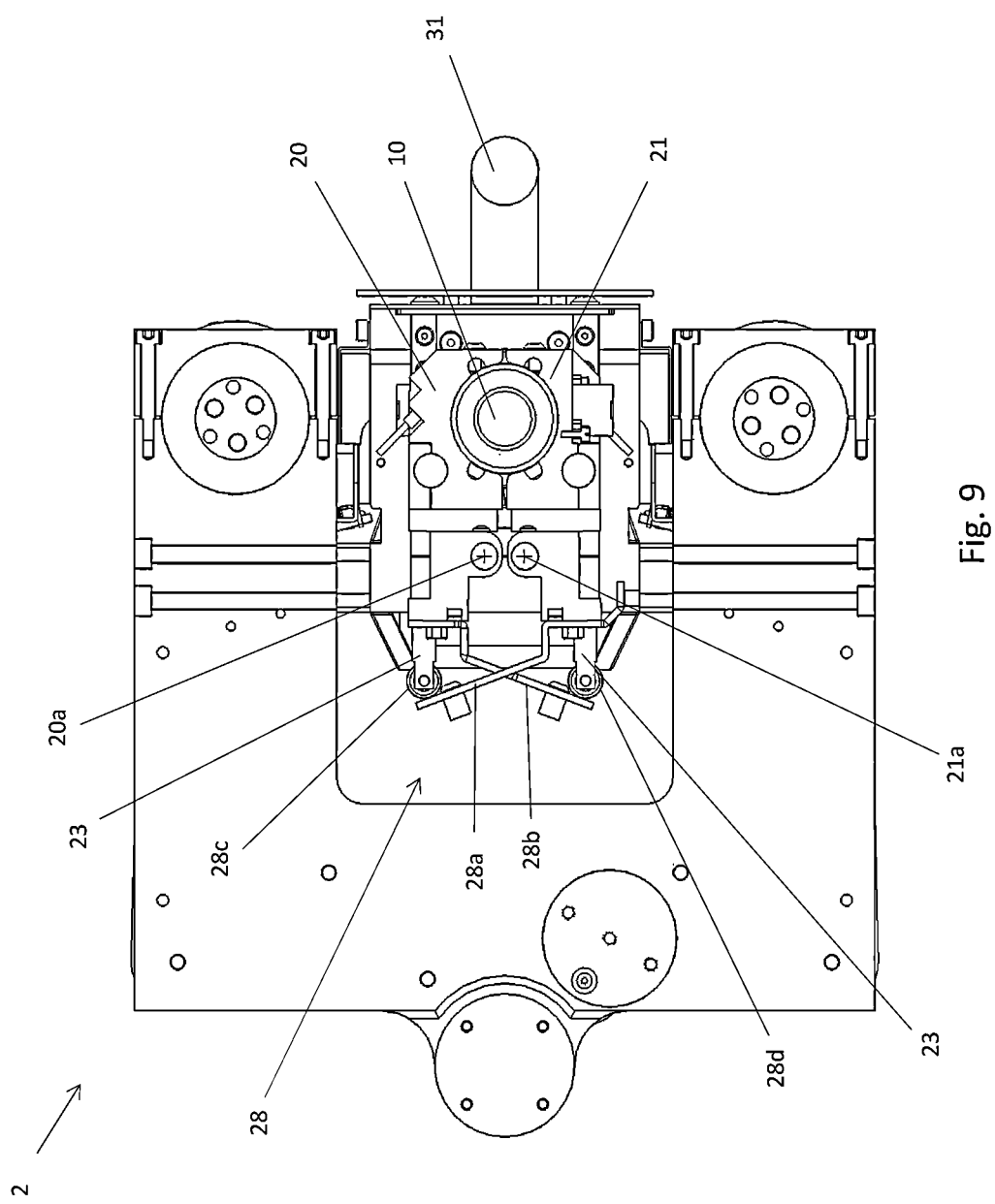
FIG. 9 is a partially sectional side view of the clamping device with the inserted extraction cell holder in a first sectional plane.
Figure 10:
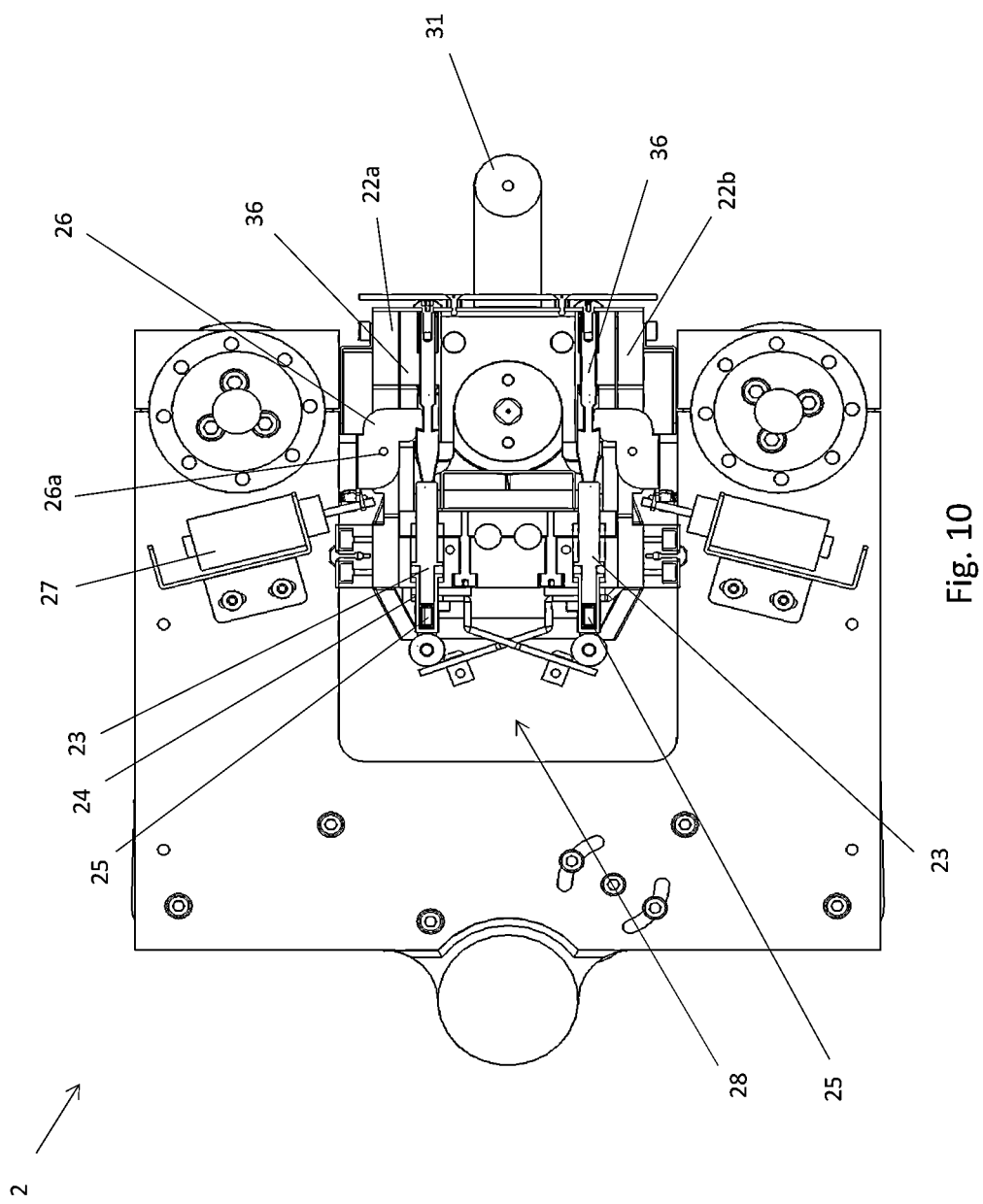
FIG. 10 is a partially sectional side view of the clamping device with the inserted extraction cell holder in a second sectional plane.
Figure 11:
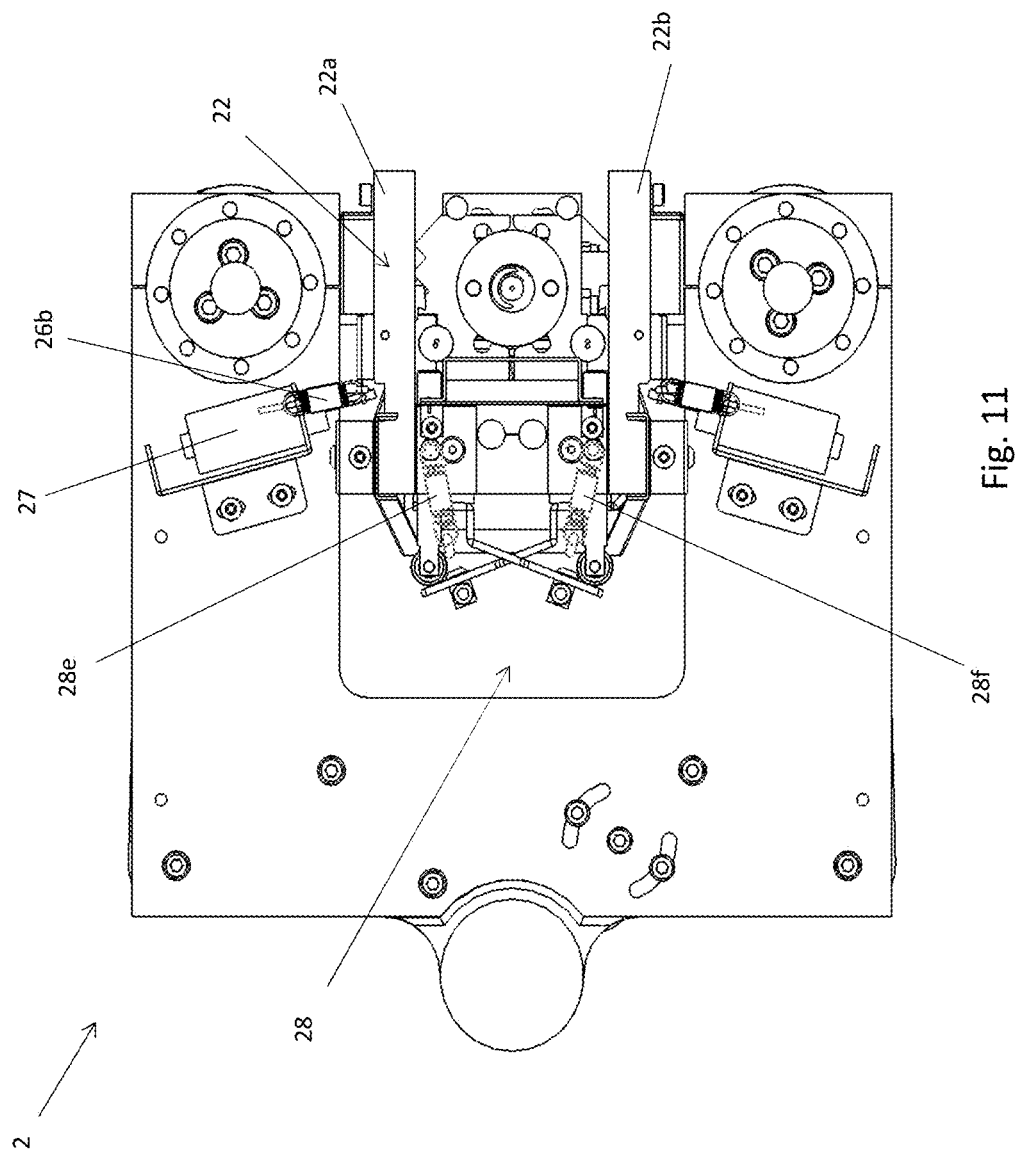
FIG. 11 is a partially sectional side view of the clamping device with the inserted extraction cell holder in a third sectional plane.

In FIGS. 6 to 11, the clamping device 2 is shown in different views. FIGS. 6 to 8 show in particular the situation before the extraction cell holder 3 is inserted into the clamping device 2 together with the extraction cell 1. In particular, two half-shell-shaped heating jaws 20, 21 can be seen, which are rotatably mounted about axes of rotation 20a and 21a, respectively. FIGS. 9 to 11 show the situation with the extraction cell holder 3 inserted and locked, in which the heating jaws 20, 21 are in their heating position, in which they positively enclose the extraction cell 1 and/or its tubular extraction element 10.

The insertion of the extraction cell holder 3 into the clamping device 2 is achieved by a guiding and positioning arrangement 22, of which an upper guide rail 22a, 22b and lower guide rails 22c, 22d can be seen in FIG. 6. These come into guiding contact with the extraction cell holder 3, and in particular with its receiving holder 30, to enable pushing the extraction cell holder 3 into the clamping device 2 in a linear movement. During the linear insertion of the extraction holder 3 into the clamping device 2, the extensions of the locking pins 36 come into contact with pressure pins 23 which are guided in bores 24 (FIG. 10). In order to compensate for any length tolerances during manufacture, the pressure pins 23 work together with springs 25.

The extraction cell holder 3 with its receiving holder 30 can be inserted into the clamping device 2 until the locking elements 26 come into a locking position with the locking pins 36, in which the locking element 26 engages in an undercut 36a (FIG. 3) of the locking pin 36. For this purpose, the locking element 26 is rotatably mounted about an axis 26a (FIG. 10), and is pressed into the locking position by spring elements 26b (FIG. 11). The preload of the spring elements 26b required for this is achieved when the extraction cell holder 3 is pushed in through the inclined front region 36b of the locking pin 36 (FIG. 3) as a result of the locking element 26 rotating it into the preloaded position until the undercut 36a of the locking element is passed, thereby snapping the locking element into the undercut 36a due to the force of the spring element 26b. A corresponding locking takes place in all four locking pins 36 which interact with corresponding locking elements 26.

In order to bring the locking element 26 from the locking position shown in FIG. 10 into an open position, a release element 27 is provided, which is formed, for example, by an electromagnet that causes the locking element 26 to rotate about the axis 26a, such that the locking element 26 disengages from the undercut 36a of the locking pin 36. The ejector springs 39 compressed during the insertion movement of the extraction cell holder then cause a displacement of the locking pins 36 relative to the receiving holder 30, such that the manipulating handle 31 also moves accordingly outward. The extraction cell holder 3 is then released in this position and can be pulled out manually or automatically using the manipulating handle 31.

In order to move the heating jaws from the open position shown in FIGS. 6 to 8 into the heating position shown in FIGS. 9 to 11, a displacement mechanism 28 is provided. In this case, it has one multi-folded rigid rod 28a or 28b for each heating jaw 20, 21, respectively, one end of which is fixedly connected to the associated heating jaw 20 or 21, respectively. The other end of the rods 28a, 28b comes into contact with the axially movable pressure pins 23. For this purpose, the pressure pins 23 have ball bearings 28c, 28d at the end opposite the locking pin, which, when the pressure pins 23 move, roll on the rods 28a or 28b that are in contact therewith, causing the heating jaws 20, 21 to rotate about their axes of rotation 20a, 20b (FIGS. 7, 9 and 10). During the closing movement of the heating jaws 20, 21, springs 28e, 28f are compressed. These cause the heating jaws 20, 21 to open automatically when the locking elements 26 are unlocked by the release element 27, and the pressure pins 23 are accordingly released.

The linear insertion movement of the extraction cell holder thus causes an automatic and purely mechanical positioning of the extraction cell, as well as a locking of the extraction cell holder. At the same time, the heating jaws 20, 21 are pivoted from their open position into their heating position, in which they surround the extraction cell in a form-fitting manner, and thereby ensure good heat transfer. An electrical impulse for actuating the release element can be provided solely for unlocking. However, a purely mechanical release by means of a push button would also be conceivable in this case.

Figure 12:
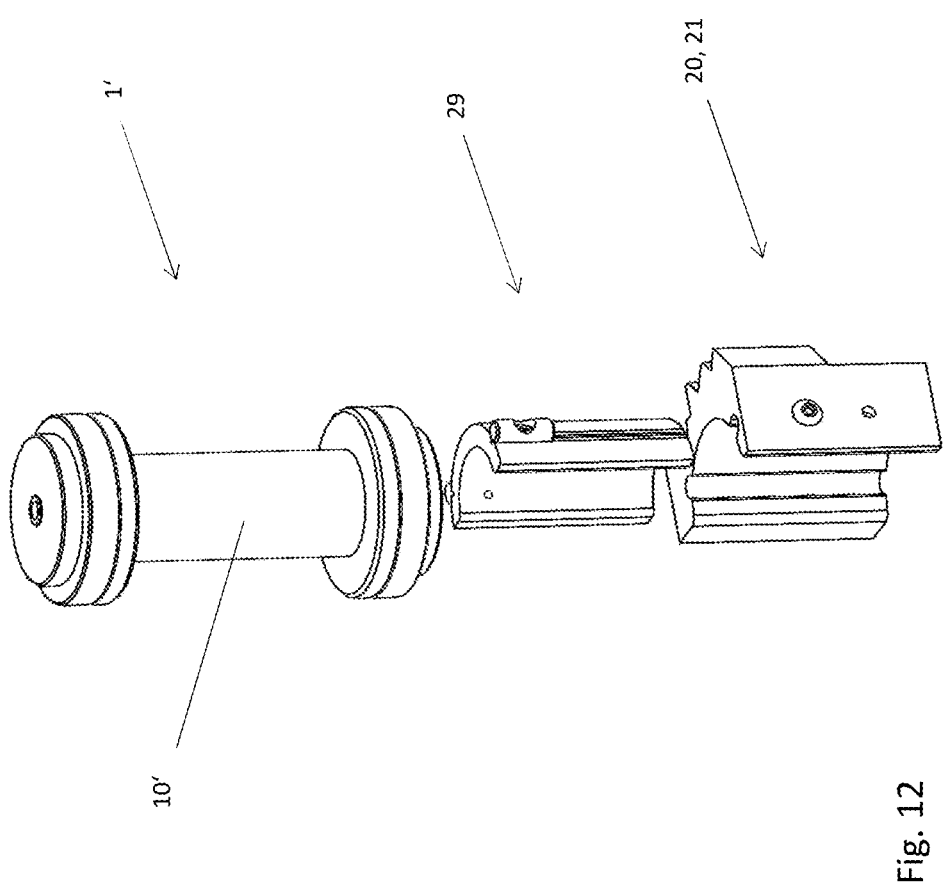
FIG. 12 is a three-dimensional representation of an extraction cell with a smaller diameter, and a heating jaw with an adapter piece.

FIG. 12 shows an optional embodiment in which the clamping device can also be used for extraction cells 1' with a smaller diameter. For this purpose, adapter pieces 29 are provided for the heating jaws 20, 21 in order to enable a form-fitting connection with an extraction cell 1' which has a tubular extraction element 10' with a smaller diameter. The fastening of the adapter pieces 29 is achieved by pushing them onto the heating jaws 20, 21, by way of example. In this way, the heating jaws can be adapted to different diameters of the extraction bodies.

As soon as the extraction cell 1 is positioned in the clamping device 2 with the aid of the extraction cell holder 3 (FIG. 1), the extraction cell 1 is clamped from above and below with the aid of clamping jaws 2a and 2b, wherein the clamping jaws 2a, 2b come into contact with the first and/or second closure arrangement 13, 14 of the extraction cells 1 in a known manner and ensure the pressure seal required for the application. At the same time, the fluid connection device 4 is connected to the first and/or second fluid connectors 15, 16 of the extraction cell 1 in order to then carry out the extraction of analytes from the sample, which is known per se.

The invention claimed is:

1. An extraction system for extracting analytes from a sample, having
    an extraction cell for receiving the sample, which has at least one first fluid connector for the supply or discharge of a fluid, and
    a clamping device for clamping the extraction cell, and
    a fluid connection device for establishing a fluid connection with the at least one first fluid connector of the extraction cell,
further comprising:
an extraction cell holder is provided for receiving the extraction cell, and the clamping device has a guiding and positioning arrangement for linearly inserting the extraction cell holder, together with the extraction cell, in order to position the extraction cell in an insertion position of the extraction system,
the extraction system further includes at least two heating jaws that which can be moved between an open position and a heating position, and which are in heating contact with the extraction cell in the heating position, and
the extraction system further includes a displacement mechanism for moving the heating jaws, the displacement mechanism having an operative connection with the extraction cell holder during the linear insertion thereof, in order to move the heating jaws from the open position into the heating position.

2. The extraction system according to claim 1, wherein the extraction cell has a tubular extraction element with a first end and an opposite second end, which provides an interior space for receiving the sample, and the extraction cell furthermore has a first closure arrangement for closing and sealing the first end of the tubular extraction element, and a second closure arrangement for closing and sealing the second end of the tubular extraction element.

3. The extraction system according to claim 2, wherein the first closure arrangement has the first fluid connector, and the second closure arrangement has a second fluid connector for the supply or discharge of a fluid.

4. The extraction system according to claim 1, wherein the extraction cell holder has a receiving holder for holding the extraction cell, and has a manipulating handle for inserting the extraction cell holder into the extraction system and pulling it out of the same.

5. The extraction system according to claim 1, wherein the guiding and positioning arrangement has at least one locking element which, when the extraction cell holder is in the inserted position, is in a locking position therewith.

6. The extraction system according to claim 5, further comprising at least one release element is provided for moving the locking element from the locking position into an open position.

7. The extraction system according to claim 5, wherein the extraction cell holder has at least one locking pin which is in locking engagement with the at least one locking element in the inserted position of the extraction cell holder.

8. The extraction system according to claim 1, wherein the extraction cell is cylindrical, and the heating jaws are designed as half-shells, such that the heating jaws enclose the extraction cell in a form-fitting manner in the heating position.

9. The extraction system according to claim 1, further comprising adapter pieces provided for adapting the at least two heating jaws to smaller extraction cell diameters, and are designed for attachment to the at least two heating jaws.

10. The extraction system according to claim 1, further comprising at least one spring element for opening the heating jaws from the heating position to the open position, the at least one spring element being arranged in such a way that it is preloaded when the heating jaws are moved from the open position into the heating position.

11. The extraction system according to claim 1, wherein each of the movable heating jaws is rotatably mounted about an axis of rotation, and the displacement mechanism converts the linear insertion movement of the extraction cell holder into a rotation of the heating jaws around their axes of rotation.

12. An extraction system for extracting analytes from a sample, having
    an extraction cell for receiving the sample, which has at least one first fluid connector for the supply or discharge of a fluid, and
    a clamping device for clamping the extraction cell, and—a fluid connection device for establishing a fluid connection with the at least one first fluid connector of the extraction cell,
further comprising:
an extraction cell holder is provided for receiving the extraction cell, and the clamping device has a guiding and positioning arrangement for linearly inserting the extraction cell holder, together with the extraction cell, in order to position the extraction cell in an insertion position,
the guiding and positioning arrangement has at least one locking element which, when the extraction cell holder is in the inserted position, is in a locking position therewith, the extraction cell holder has at least one locking pin which is in locking engagement with the at least one locking element in the inserted position of the extraction cell holder, and the extraction cell holder has a receiving holder for holding the extraction cell, and has a manipulating handle for inserting the extraction cell holder into the extraction system and pulling it out of the same, wherein the at least one locking pin is movably guided in the receiving holder, and can be moved relative to the receiving holder by means of the manipulating handle.

13. The extraction system according to claim 12, wherein the extraction system has at least two heating jaws which can be moved between an open position and a heating position, and which are in heating contact with the extraction cell in the heating position.

14. The extraction system according to claim 13, further comprising a displacement mechanism for moving the heating jaws is provided, which has an operative connection with the extraction cell holder during the linear insertion thereof, in order to move the heating jaws from the open position into the heating position.

15. The extraction system according to claim 12, wherein the extraction cell holder has a protective plate as heat and/or burst protection between the receiving holder and the manipulating handle.

\* \* \* \* \*